US006866803B1

(12) United States Patent
Matsumoto et al.

(10) Patent No.: US 6,866,803 B1
(45) Date of Patent: Mar. 15, 2005

(54) MOLD FOR USE IN SLIP CASTING METHOD, AND METHOD OF MANUFACTURING OPEN POROUS BODY FOR USE IN MOLD

(75) Inventors: Akio Matsumoto, Fukuoka (JP); Takeshi Sato, Fukuoka (JP); Yoshifumi Misumi, Fukuoka (JP); Akira Hirayama, Fukuoka (JP); Katsuhiro Hasebe, Fukuoka (JP); Yoshinori Yamashita, Fukuoka (JP)

(73) Assignee: Toto Ltd., Fukuoka (JP)

( * ) Notice: Subject to any disclaimer, the term of this patent is extended or adjusted under 35 U.S.C. 154(b) by 892 days.

(21) Appl. No.: 09/613,362

(22) Filed: Jul. 10, 2000

Related U.S. Application Data

(62) Division of application No. 09/032,284, filed as application No. PCT/JP96/02368 on Aug. 26, 1996, now Pat. No. 6,165,398.

(30) Foreign Application Priority Data

Aug. 26, 1995 (JP) ............................................ 7-254418
Sep. 26, 1995 (JP) ............................................ 7-285445

(51) Int. Cl.$^{7}$ ......................... B29C 33/56; B29C 44/02; C08J 9/20; C08J 9/28

(52) U.S. Cl. .......................... 264/42; 264/41; 264/45.3; 264/225; 264/331.12; 264/337; 264/109; 264/122; 521/64; 521/100; 521/127; 521/128; 521/178; 528/111.3; 528/123; 106/38.35

(58) Field of Search ........................... 264/41, 42, 45.3, 264/225, 331.12, 337, 109, 122; 521/64, 100, 127, 128, 178; 528/111.3, 123; 106/38.35

(56) References Cited

U.S. PATENT DOCUMENTS

| | | | | | |
|---|---|---|---|---|---|
| 4,160,003 | A | | 7/1979 | Kozuka et al. | |
| 4,464,485 | A | * | 8/1984 | Kishima et al. | 521/64 |
| 4,727,092 | A | | 2/1988 | Will | |
| 4,783,489 | A | | 11/1988 | Inoue et al. | |
| 4,797,425 | A | * | 1/1989 | Kishima et al. | 521/64 |
| 4,801,624 | A | | 1/1989 | Will | |
| 4,818,453 | A | | 4/1989 | Inoue et al. | |
| 4,828,771 | A | * | 5/1989 | Kishima et al. | 264/41 |
| 4,867,662 | A | | 9/1989 | Shimahara et al. | |
| 4,892,891 | A | | 1/1990 | Close | |
| 4,908,174 | A | | 3/1990 | Will | |
| 5,013,500 | A | | 5/1991 | Hamanaka et al. | |
| 5,017,632 | A | * | 5/1991 | Bredow et al. | 523/400 |
| 5,242,635 | A | * | 9/1993 | Matsumoto et al. | 264/41 |

FOREIGN PATENT DOCUMENTS

| | | |
|---|---|---|
| EP | 140682 | 5/1985 |
| EP | 194757 | 9/1986 |
| EP | 372871 | 6/1990 |
| EP | 312322 | 3/1994 |
| GB | 1533481 | 11/1978 |

(List continued on next page.)

*Primary Examiner*—Michael P. Colaianni
*Assistant Examiner*—Michael I. Poe
(74) *Attorney, Agent, or Firm*—Carrier, Blackman & Associates, P.C.; Joseph P. Carrier; William D. Blackman

(57) ABSTRACT

A slip casting mold includes a water absorption layer having self water absorption capability and substantial water resistance. With the water saturation percentage of the water absorption layer being controlled, a slurry layer is deposited in the slip casting mold mainly under capillary attractive forces of the slip casting mold. The water absorption layer comprises an open porous body which is manufactured by stirring a mixture of an epoxy compound having at least one epoxy ring in one molecule, a hardener for reacting with the epoxy compound to harden the epoxy compound, a filler for developing self water absorption capability and mold releasability, and water into an O/W-type emulsion slurry, and casting the emulsion slurry into a mold impermeable to water, hardening the emulsion slurry in the mold while containing water.

13 Claims, 4 Drawing Sheets

FOREIGN PATENT DOCUMENTS

| | | |
|---|---|---|
| JP | 3515690 | 10/1960 |
| JP | 4945108 | 4/1974 |
| JP | 49124171 | 11/1974 |
| JP | 5147903 | 4/1976 |
| JP | 532464 | 1/1978 |
| JP | 55128411 | 10/1980 |
| JP | 5818207 | 4/1983 |
| JP | 5936141 | 2/1984 |
| JP | 5942698 | 10/1984 |
| JP | 6092806 | 5/1985 |
| JP | 60154004 | 8/1985 |
| JP | 60183104 | 9/1985 |
| JP | 61297103 | 12/1986 |
| JP | 629910 | 1/1987 |
| JP | 6242805 | 2/1987 |
| JP | 6226657 | 6/1987 |
| JP | 63202407 | 8/1988 |
| JP | 63202407 | 10/1988 |
| JP | 63288705 | 11/1988 |
| JP | 63310776 | 12/1988 |
| JP | 199801 | 4/1989 |
| JP | 1141002 | 6/1989 |
| JP | 1180307 | 7/1989 |
| JP | 1186303 | 7/1989 |
| JP | 1131508 | 9/1989 |
| JP | 1139505 | 9/1989 |
| JP | 1222901 | 9/1989 |
| JP | 1244806 | 9/1989 |
| JP | 149803 | 10/1989 |
| JP | 215364 | 4/1990 |
| JP | 215365 | 4/1990 |
| JP | 217328 | 4/1990 |
| JP | 285103 | 7/1990 |
| JP | 299606 | 8/1990 |
| JP | 2307707 | 12/1990 |
| JP | 353339 | 8/1991 |
| JP | 362526 | 9/1991 |
| JP | 3505750 | 12/1991 |
| JP | 4334402 | 11/1992 |
| JP | 58936 | 2/1993 |
| JP | 543733 | 2/1993 |
| JP | 539972 | 6/1993 |
| JP | 5185408 | 7/1993 |
| JP | 554496 | 8/1993 |
| JP | 571523 | 10/1993 |
| JP | 580324 | 11/1993 |
| JP | 5345835 | 12/1993 |
| WO | 9006331 | 6/1990 |

* cited by examiner

MOLD FOR USE IN SLIP CASTING METHOD, AND METHOD OF MANUFACTURING OPEN POROUS BODY FOR USE IN MOLD

This is a divisional application of prior pending application U.S. Ser. No. 09/032,284 which has a 35 USC § 371 (c) and 102 (e) date of Feb. 26, 1998 now U.S. Pat. No. 6,165,398, and was the U.S. National Phase of International Application PCT/JP96/02368 filed Aug. 26, 1996.

FIELD OF THE INVENTION

The present invention relates to a method of slip casting a powdery material such as an inorganic, organic, or metallic powdery material, a mold for use in a slip casting method, and a method of manufacturing an open porous body for use in a mold.

DESCRIPTION OF THE RELEVANT ART

Heretofore, molds for slip casting powdery materials have primarily been in the form of gypsum molds for various reasons. The gypsum molds are inexpensive, can easily be formed to shape, and, most importantly, have the following two superior properties for use as molds: (1) The gypsum molds have a self water absorption capability (Since some slurries used in the slip casting process employ an organic solvent rather than water, the term "water" used in the present invention should be interpreted as covering an organic solvent. Therefore, the water absorption capability is meant to include an ability to absorb an organic solvent.) (2) The gypsum molds allow molded products to be removed with good mold releasability.

A depositing step in a slip casting process causes water in a slurry to be absorbed by a porous mold. The water is absorbed by the porous mold under a differential pressure between a mold surface and a deposition surface (a boundary surface between a region where the slurry is deposited and a region where the slurry is not deposited). The differential pressure may be developed by roughly two mechanisms, i.e., capillary attractive forces produced by the mold and an external pressure applied to the mold or the slurry, e.g., the gravity head pressure of the slurry, the forces applied to directly press the slurry, or the suction forces applied to evacuate the mold. The self water absorption capability, which is the first advantage of the gypsum molds, is produced by the capillary attractive forces, and allows a slurry to be deposited without applying an external pressure.

A mold releasing step of removing a molded product from a mold is important in the slip casting process. If the molded product is not smoothly released from the mold, the molded product will be deformed as it is soft. The reason why a gypsum mold provides good mold releasability is that since gypsum is poor in water resistance, the surface of the gypsum mold is dissolved into water little by little. Stated otherwise, the good mold releasability provided by the gypsum mold is achieved because the molding surface of the gypsum mold is peeled off together with the molded product.

As described above, the gypsum molds have two advantages, i.e., good mold releasability and self water absorption capability. These advantages, however, are associated with disadvantages. Because the self water absorption capability is achieved by the capillary attractive forces, the rate at which the slurry is deposited cannot be substantially increased, posing a limitation on efforts to increase the productivity. Inasmuch as the good mold releasability is provided by dissolving the molding surface of the mold, the molding surface will be greatly worn when the mold is used in many slip casting processes. The number of products that can be molded by one mold, i.e., the service life of one mold, is only in the range from 80 to 150.

In order to eliminate the above shortcomings of the gypsum molds, there has been used a mold of water-resistant resin. A slurry is deposited in the mold of water-resistant resin by directly applying a pressure to the slurry. Therefore, when the pressure applied to the slurry is increased, the rate at which the slurry is deposited is also increased. The mold of water-resistant resin provides mold releasability which is much lower than the gypsum molds. Therefore, it has been customary to deliver air under pressure to the mold of water-resistant resin, i.e., to apply a back pressure to the mold, for supplying water accumulated in the mold and the air to a boundary surface between the mold and the molded product thereby to release the molded product from the mold. Specifically, Japanese patent publication No. 2-15364 discloses an air groove defined in a mold, and Japanese patent publication No. 2-15365 shows a coarse porous layer disposed on the reverse side of a mold having a molding surface. The water and the air are supplied to the boundary surface between the mold and the molded product through the air groove or the coarse porous layer. Air grooves defined in molds are also proposed in Japanese patent publications Nos. 1-49803 and 2-17328.

Porous materials of resin molds for pressure casting include epoxy, acrylic, and unsaturated polyester materials. Among these materials, the epoxy materials are widely used for the reasons of small shrinkage and heat generation upon curing. There have been proposed open porous bodies as disclosed in Japanese patent publications Nos. 53-2464, 62-26657, 5-8936, 5-39972, 5-43733, and 5-345835. Many porous bodies of ceramic and metallic materials, rather than the resin materials, have been proposed as water-resistant mold materials for pressure casting.

The pressure casting contributes to an increase in the productivity because the rate at which the slurry is deposited by the pressure casting is much higher than the gypsum slip casting due to direct pressurization of the slurry as described above. However, the direct pressurization of the slurry requires the provision of a strong piping structure, a strong mold structure, and a strong press structure for combining mold members (a molding space in a mold is usually formed by combining a plurality of mold members), resulting in a huge cost required for the molding facility.

The cost of the required molding facility is smaller for an arrangement in which no external pressure is applied to the slurry, as is the case with the slip casting process using the gypsum mold. It is an economically better choice to use a water-resistant mold material rather than gypsum in order to increase the service life of a mold, and deposit the slurry mainly under capillary attractive forces of the mold material, as is the case with the slip casting process using the gypsum mold.

However, the above choice suffers large problems. Since the water-resistant mold material is used, it does not provide mold releasability of its own accord as with the gypsum molds. Japanese patent publication No. 5-80324, for example, discloses an unsaturated polyester mold material having a self water absorption capability under capillary attractive forces, but only describes, with respect to mold releasability, the application of a gypsum spray to the surface of the mold prior to a slip casting process and the use of heat radiation or hot air when removing the molded product from the mold. These attempts to achieve mold releasability require respective facilities to remove the gypsum powder attached to the surface of the molded product in the former arrangement and to generate the heat radiation or hot air in the latter arrangement. Therefore, such facilities are as costly as the pressure casting facilities.

There has also been proposed a mold material such as resin-containing gypsum or gypsum which contains a water-insoluble filler, rather than ordinary gypsum. However, the water resistance of these special gypsum mold materials is only slightly larger than the water resistance of ordinary gypsum, and the number of molded products that can be produced by one mold of such special gypsum mold materials ranges from 200 to 300, which is slightly greater than with the gypsum molds.

One merit that is obtained when a back pressure is applied to the mold to release the molded product from the mold is that it allows molded products to be produced in a successive slip casting process which has not been possible with the conventional gypsum molds. Specifically, the deposition of a molded product is carried out in a gypsum mold by absorbing water in a slurry under capillary attractive forces of the mold. Consequently, when 1–3 molded products are successively formed by a dry gypsum mold, the pores of the gypsum mold are filled with water, making it impossible to develop capillary attractive forces. According to the customary practice, therefore, after 1–3 molded products are successively formed by a gypsum mold in daytime, the gypsum mold is dried almost completely at night, and then used for slip casting the next morning. As a result, the productivity of the gypsum mold is low, and the cost of energy used to dry the gypsum mold is noticeably large.

If a water-resistant material rather than gypsum is developed, then it may be used as a mold material, and the short coming of poor mold releasability due to its water resistance may be eliminated by using a mechanism to apply a back pressure to supply water and air between the mold and the molded product to release the molded product from the mold. Because water absorbed by the mold in the molding process can be discharged by the above mechanism, capillary attractive forces can be recovered for successively molding molded products. However, even such a water-resistant material would suffer the following drawbacks:

Since capillary attractive forces cannot be produced when the pores of the mold are filled with water, a back pressure is exerted to the mold to remove the water from the mold. However, resistance to the passage of air and water poses problems. Specifically, a mold which has large capillary attractive forces and a high deposition rate has pores of small diameter, and hence it is not easy to remove water from the pores.

When a back pressure is applied to the mold to release the molded product therefrom, if a large amount of air were discharged, the molded product would tend to be broken and damaged by the air. For smoothly removing the molded product from the mold, therefore, it is necessary to create a water film between the mold and the molded product. Such a water film can be formed relatively easily in the pressure casting process for the following reasons: Because the mold is not required to have capillary attractive forces in casting cycles of the pressure casting process, the mold is used substantially in a water-saturated condition, which signifies the suction of much more water upon slurry deposition than a small amount of water discharged upon release of the molded product (therefore, it is necessary to discharge a considerable amount of water out of the mold upon slurry deposition). In the slip casting which primarily employs capillary attractive forces to deposit a slurry, it is necessary to remove water from the pores of the mold in order to produce capillary attractive forces, and hence the slip casting process has to be carried out under conditions to break the water film with ease. Using the mechanism to apply a back pressure for releasing the molded product from the mold results in an increase in the cost compared with the gypsum slip casting.

SUMMARY OF THE INVENTION

It is therefore an object of the present invention to provide a casting method which will provide excellent deposition capability and mold releasability in a slip casting method that primarily employs capillary attractive forces to deposit a slurry, without incurring as much facility cost as the known pressure casting process.

Another object of the present invention is to provide a slip casting mold material which can produce more molded products and has better productivity (deposition capability and mold releasability) than the conventional gypsum slip casting mold, and a method of manufacturing such a slip casting mold material.

The above objects can be achieved according to the invention by a method of slip casting a powdery material with a slip casting mold having a self water absorption capability and a water absorption layer which is substantially water resistant, comprising the steps of I) controlling the water saturation percentage of the water absorption layer, II) pouring a slurry into the slip casting mold, III) depositing the slurry on the water absorption layer under a slip casting pressure which comprises a pressure selected from at least one of a) a slurry head pressure, b) a suction vacuum applied to the water absorption layer, and c) a pressure of at most 0.3 MPa applied directly to the slurry, and IV) releasing a deposited molded body from the slip casting mold.

The inventors have made detailed studies with respect to a process of controlling the layer depositing capability and mold releasability of a slip casting mold for the purpose of accomplishing the above objects. As a consequence, there is also provided in accordance with the present invention a method of manufacturing an open porous body for use in a slip casting mold for slip casting a powder material, comprising the steps of: stirring a mixture of an epoxy compound having at least one epoxy ring in one molecule, a hardener for reacting with the epoxy compound to harden the epoxy compound, a filler for developing self water absorption capability and mold releasability, and water into an O/W-type emulsion slurry; casting the emulsion slurry into a mold impermeable to water; and hardening the emulsion slurry in the mold while containing the water. The open porous body can be used in a slip casting mold which has self water absorption capability and mold releasability.

There is also provided according to the invention a slip casting mold for slip casting a powdery material, which uses the open porous body as a water absorption layer thereof.

Further objects, advantages and salient features of the invention will become apparent from the following detailed description which, when considered in conjunction with the annexed drawings, describes presently preferred embodiments of the invention.

DETAILED DESCRIPTION OF PREFERRED EMBODIMENTS

Figure 1:
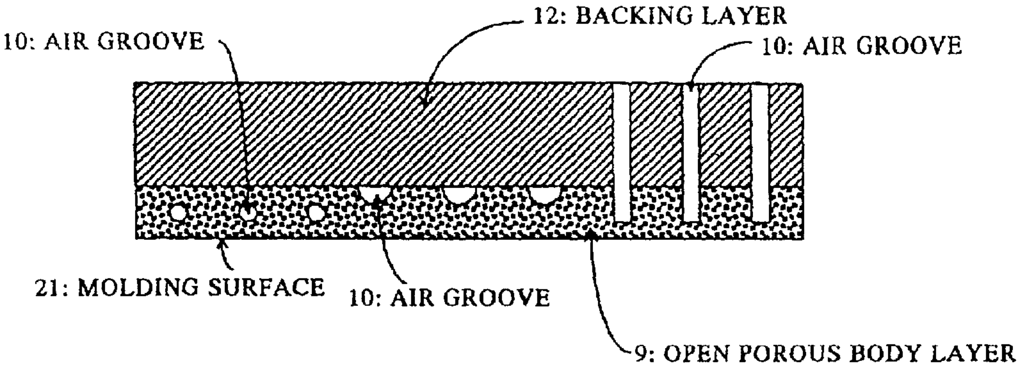
FIG. 1 is a cross-sectional view showing air grooves defined in an open porous body layer according to the present invention.

The presently preferred embodiments of the present invention will be described below with reference to the accompanying drawings and tables.

The step of controlling the water saturation percentage of a water absorption layer in a method of slip casting a powdery material will first be described below.

Table 1 shows the relationship between the mold water saturation percentage, the deposition rate constant k, and the molded body water content percentage of a molded body at the time a slurry for molding a piece of sanitary earthenware is poured into an epoxy resin mold test piece. The mold water saturation percentage is 100% when all the mold pores are filled with water. The deposition rate constant k is calculated according to the equation: $k=L^2/T$ where T is the time required to deposit a layer to a thickness of about 8 mm in the mold, and L is the measured thickness of the deposited layer. The molded body water content percentage is a water content percentage with respect to a dry reference immediately after the layer was deposited to a thickness of about 8 mm in the mold.

TABLE 1

| Mold water saturation percentage (%) | Deposition rate constant k ($mm^2$/100 sec) | Molded body water content percentage (%, dry base) |
|---|---|---|
| 0.4 | 1.8 | 25.9 |
| 9.5 | 1.9 | 26.0 |
| 20.3 | 1.8 | 26.1 |
| 31.5 | 2.0 | 25.8 |
| 40.3 | 2.6 | 24.7 |
| 50.8 | 2.8 | 24.1 |
| 60.1 | 2.8 | 24.2 |
| 70.9 | 2.5 | 24.8 |
| 78.1 | 2.3 | 25.2 |
| 81.0 | 1.2 | 26.9 |

As can be seen from Table 1, the deposition rate constant k is the greatest when the mold water saturation percentage is in the range of 30 to 80%, and is lower in a dry state which has been considered to be a good condition for the gypsum slip casting. The molded body water content percentage may be considered as important a factor as the deposition rate because mold materials with smaller water content percentages are more resistant to deformation upon removal of the molded product and are subject to smaller dry shrinkage after removal of the molded product. From this standpoint, it is preferable to control the mold water saturation to range from 30 to 80%.

A slurry is poured into the mold whose water saturation percentage has thus been controlled, and then the step of depositing a layer in the mold is carried out.

In the method of slip casting a powdery material according to the present invention, capillary attractive forces of the mold are primarily employed to deposit a layer in the mold. However, another pressure may alternatively or additionally be employed as a slip casting pressure. For example, since the head pressure of the slurry is usually used to pour the slurry into the mold, the head pressure may conveniently be used as the slip casting pressure.

In a slip casting process using an ordinary gypsum mold, since the gypsum has relatively small strength and suffers cracks even when it is slightly deformed, the head height is limited to at most about 0.4 m (the slurry head height indicates the distance from the uppermost portion of the molded product to the upper surface of the slurry).

In a preferred embodiment according to the present invention, since a resin mold of a greater strength is used, the head height can be increased preferably to 0.4 m or more and more preferably to 0.6 m or more.

The increased head height results in such an advantage that it can increase the deposition rate when applied as a slip casting pressure. However, any practical slurry head height, no matter how high it may be, is smaller than the capillary attractive forces of the mold. The greatest merit of the increased head height is to be able to reduce the molded product water content percentage, and manifests itself according to the present invention as compared with the gypsum slip casting.

If a mechanism for passing air and water is used to control the water saturation percentage of the mold material and release the molded product from the mold, as described later on, then the mechanism may be employed to evacuate the mold under a vacuum suction pressure which may be used as a slip casting pressure. The vacuum suction pressure may also be used not only in the step of depositing a layer, but also in the step of pouring the slurry and the step of compacting the deposited layer, as described later on. If the vacuum suction pressure is used in the step of pouring the slurry, then since air is removed from the molding space in the mold, the slurry can be poured into the mold at an increased speed, and pins are less liable to exist in the molded product. If the vacuum suction pressure is used in the step of compacting the deposited layer, then the deposited layer is compacted at an increased speed.

If the mold is evacuated during the step of depositing a layer in the mold, however, then the surface of the molded product may possibly be peeled off upon removal from the mold depending on the type of the material of the molded product and the conditions under which the molded product is formed. If the material of the molded product contains many fine particles, then the surface of the molded product is more likely to be peeled off.

The surface of the molded product may be prevented from being peeled off by a process of not evacuating the mold from a time near the end of the deposition step, rather than evacuating the mold throughout the deposition time of the deposition step. If such a process is employed, then it is preferable to evacuate the mold during a time selected in the period from the start of the deposition step to 80% of the time of the deposition step. For example, if the deposition time is 30 minutes, then the time during which to evacuate the mold may be selected from 0 minute to 24 minutes, or 0 minute to 20 minutes, or 2 minutes to 20 minutes where 0 minute is the start time of the deposition step. Another process of preventing the surface of the molded product from being peeled off is to reduce the suction vacuum as the deposition time progresses in the deposition step. For example, if the deposition time is 60 minutes, then the suction vacuum may be reduced such that it is 0.08 MPa from 0 minute to 30 minutes, 0.04 MPa from 30 minute to 50 minutes, and 0.01 MPa from 50 minutes to 60 minutes, where 0 minute is the start time of the deposition step.

The above two processes may be combined with each other. For example, if the deposition time is 50 minutes, then, then the suction vacuum may be 0.06 MPa from 0 minute to 30 minutes and 0.02 MPa from 30 minute to 40 minutes, and the mold is not evacuated from 40 minutes to 50 minutes where 0 minute is the start time of the deposition step.

The slip casting pressure in the slip casting method according to the present invention may be produced by a piston or a pump for directly pressurizing the slurry, as with the pressure casting. However, it is not preferable to directly pressurize the slurry because the mold and the casting machine will have to be of a rugged construction. If the slurry is nevertheless to be directly pressurized, then the pressure applied to the slurry should be 0.3 MPa or less.

After the slurry has been deposited to the point where the molded product has a predetermined thickness, the molded product is released from the mold. The molded product may be released from the mold by either a natural releasing process in which the molded product is released from the mold naturally of its own accord or a water film releasing process in which the molded product is released from the mold by water and air supplied to a boundary surface between the mold and the molded product under a back pressure applied to the mold. The natural releasing process requires use of a mold material which provides self mold releasability while substantially maintaining water resistance, and will be described later on. The water film releasing process is required to discharge water and air uniformly from the surface of the mold. Unless a water film is created in the boundary surface between the mold and the molded product, the molded product will be blown off by the air. The above preferable range from 30 to 80% for the water saturation percentage prior to the pouring the slurry into the mold is a range appropriate for smoothly releasing the molded product from the mold with the water film (The water saturation percentage may be 80% or more, e.g., 100%, for releasing the molded product from the mold with the water film, but the deposition rate is lower with such water saturation percentage).

There are two types of slip casting processes, i.e., a solid casting process in which water is absorbed by the mold from opposite sides of the molded product (also referred to as a core casting process, with a portion of the molded product thus produced being referred to as a core portion), and a drain casting process in which water is absorbed by the mold from one side of the molded product and an excessive slurry is drained after a layer is deposited to a predetermined thickness (also referred to as a single-sided casting process, with a portion of the molded product thus produced being referred to as a single-sided portion). Most pieces of sanitary earthenware include both core and single-sided portions in a molded body.

The method according to the present invention is applicable to both the solid casting process and the drain casting process. However, if the method according to the present invention is applied to the drain casting process, then it is necessary to add the step of draining an excessive slurry and the step of compacting the deposited layer by lowering the water content percentage of a slurry drained surface of the deposited layer to increase the hardness thereof, between the deposition step and the mold release step.

In the step of draining an excessive slurry, a slurry draining air hole is defined in the mold in communication with the molding space, and air is delivered under pressure into the molding space through the slurry draining air hole to discharge the excessive slurry (through a discharge port which is usually the inlet port through which the slurry has been introduced into the mold). In the next step of compacting the deposited layer, water in the slurry drained surface of the deposited layer flows through the molded product into the mold material under capillary attractive forces of the mold even when the molded product is left to stand. For shortening the time required for compacting the deposited layer, it is preferable to introduce air under pressure into a slurry draining space (usually through the slurry draining air hole).

The higher the pressure applied to air introduced into the slurry draining space for compacting the deposited layer, the greater the speed at which the water content percentage of the slurry drained surface of the deposited layer drops. In the conventional process using the gypsum mold, since the mold would otherwise be broken or the molded product would otherwise crack, an upper limit for the air pressure applied in the step of compacting the deposited layer has been about 0.005 MPa. According to the present invention, since the mechanism for releasing the molded product from the mold is different from that used in the gypsum slip casting process and the resin mold of a greater strength than the gypsum mold is used in the preferred embodiment, the pressure applied to compact the deposited layer can be increased, and should preferably range from 0.005 MPa to 0.4 MPa, and more preferably range from 0.007 MPa to 0.1 MPa.

The water may be caused to flow in the step of compacting the deposited layer by a suction vacuum applied to evacuate the mold in combination with the air introduced under pressure into the slurry draining space. If the mold is evacuated during the step of compacting the deposited layer in the mold, however, then the surface of the molded product may possibly be peeled off upon removal from the mold depending on the type of the material of the molded product and the conditions in which the molded product is formed. If the material of the molded product contains many fine particles, then the surface of the molded product is more likely to be peeled off.

The surface of the molded product may be prevented from being peeled off by a process of not evacuating the mold from a time near the end of the compacting step, rather than evacuating the mold throughout the compacting time of the compacting step. If such a process is employed, then it is preferable to evacuate the mold during a time selected in the period from the start of the compacting step to 80% of the time of the compacting step. For example, if the compacting time is 10 minutes, then the time during which to evacuate the mold may be selected from 0 minute to 8 minutes, or 0 minute to 5 minutes, or 2 minutes to 7 minutes where 0 minute is the start time of the compacting step.

Another process of preventing the surface of the molded product from being peeled off is to reduce the suction vacuum as the compacting time progresses in the compacting step. For example, if the compacting time is 15 minutes, then the suction vacuum may be reduced such that it is 0.08 MPa from 0 minute to 10 minutes, 0.04 MPa from 10 minute to 13 minutes, and 0.01 MPa from 13 minutes to 15 minutes where 0 minute is the start time of the compacting step.

The above two processes may be combined with each other. For example, if the compacting time is 20 minutes, then, then the suction vacuum may be 0.06 MPa from 0 minute to 10 minutes and 0.02 MPa from 10 minute to 15 minutes, and the mold is not evacuated from 15 minutes to 20 minutes where 0 minute is the start time of the compacting step.

If the mold releasing step of removing a molded product from a mold under a back pressure applied to the mold is employed, water and air are discharged from the molding surface at the end of the removal of the molded product from the mold. Therefore, if the end of the removal of the molded product from the mold is followed by the step of controlling the water saturation percentage of a water absorption layer, then the steps are carried out smoothly one after another, making it possible to control molded product releasing conditions for equalizing the water saturation percentage of the mold at the end of the removal of the molded product from the mold to the appropriate water saturation percentage of the mold at the time of pouring the slurry into the mold.

The various steps of the slip casting method according to the present invention have been described above. Now, a process of controlling the water saturation percentage of the water absorption layer will be described below.

Since the water saturation percentage of the water absorption layer is in the range of 30 to 80% at the time of pouring the slurry into the mold, it is preferable to adjust the water saturation percentage of the water absorption layer into the above range.

For example, if the amount of water absorbed from the slurry in a previous casting cycle occupies a considerable proportion of the volume of the water absorption layer, then it is necessary to dehydrate the water absorption layer before the slurry is poured into the mold. Stated otherwise, if a large amount of water is discharged from the mold when the molded produced is released from the mold under a back pressure applied thereto, then it is necessary to supply water to the water absorption layer before the slurry is poured into the mold.

The water saturation percentage of the water absorption layer may be controlled by either introducing water to discharge air or introducing water to discharge water. In addition, if the water saturation percentage of the water absorption layer is higher than a desired target value, then water may be introduced into the water absorption layer to further increase the water saturation percentage thereof, and thereafter air may be introduced to lower the water saturation percentage down to the target value. This latter process is relied upon when the water content percentage of the water absorption layer is irregular upon removal of the molded product from the mold because it is not possible to deposit a uniform layer in the mold and to form a water film upon removal of the molded product from the mold. In this case, water is introduced to make uniform the water content percentage, and then air is introduced to lower the water saturation percentage down to the target value. With this process, the molding surface and air grooves (described later) can be cleaned to increase the service life of the mold, i.e., the number of molded products that can be produced by the mold.

The water may often contain various impurities such as ions. If the water contains those various impurities, then the above process of introducing water into the water absorption layer to increase the water saturation percentage thereof, and then introducing air to lower the water saturation percentage down to the target value is not preferable as it will cause clogging of the mold.

In such a case, the introduction of water into the mold should be avoided as much as possible. If water has to be introduced periodically (e.g., once a week or a month) to clean the air grooves, then water from which impurities have been removed by various filters should be introduced into the mold.

A process of introducing air or water into the water absorption layer will be described below. It is preferable to introduce air or water into the water absorption layer by providing air and water passing means for passing air and water into the water absorption layer, and introducing air and water into the mold through the air and water passing means under a back pressure.

The air and water passing means is also effective in evacuating the mold to increase the deposition rate at the time a layer is deposited in the mold and also in applying a back pressure to the mold to release the molded product from the mold with a water film, in addition to controlling the water saturation percentage.

The air and water passing means may comprise air grooves defined within the water absorption layer or in the reverse side of the water absorption layer for passing air and water therethrough. The air grooves may be defined at constant intervals substantially parallel to the molding surface, as shown in FIG. 1, or at constant intervals substantially perpendicularly to the molding surface, or may be positioned in various patterns in the water absorption layer, so that air and water can be discharged substantially uniformly from the molding surface when a back pressure is applied to the mold. The air grooves are connected into one or more main air grooves which are connected to a pipe extending out of the mold for passing air and water therethrough.

Figure 2:
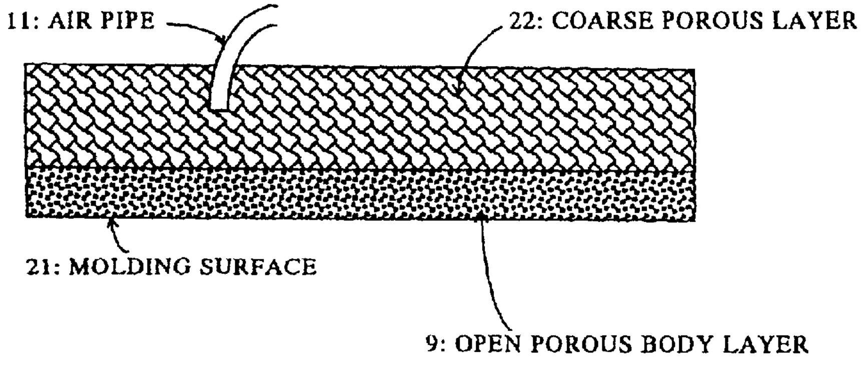
FIG. 2 is a cross-sectional view of a coarse porous layer having an air pipe and mounted on the reverse side of the open porous body layer according to the present invention.

Furthermore, the air and water passing means may comprise a coarse porous layer disposed on the reverse side of the water absorption layer and having an air pipe extending out of the mold for passing water and air, as shown in FIG. 2. In this arrangement, when the air pipe is pressurized, the pressure in the coarse porous layer tends to be relatively uniform because the pores thereof have large diameters, for thereby discharging water and air relatively uniformly from the molding surface. One air pipe may be provided per mold, or if the pressure in the coarse porous layer is not uniform with one air pipe, then a plurality of air pipes may be provided per mold. These air pipes extend out of the mold for passing air and water therethrough.

The water absorption layer which is substantially resistant to water that is used in the present invention will be described below. The term "resistant to water" means not using a mold material which achieves mold releasability by dissolving its surface, as is the case with a gypsum mold. Mold materials which are resistant to water include a resin mold material, a metallic mold material, a ceramic mold material, etc. For example, since a mold for manufacturing a product having a complex shape, such as sanitary earthenware, should preferably be a mold that can be formed by pouring a mold material, such a mold should preferably a resin mold. Resin molds include an epoxy mold, an acrylic mold, an unsaturated polyester mold, etc. In view of the viscosity of a resin, the length of a pot life, etc., an epoxy mold is relatively easy to use.

The water absorption layer has its self water absorption capability developed by capillary attractive forces of a mold material which is an open porous body. An open porous body for making a metallic mold or a ceramic mold may be produced by sintering a metallic powder or a ceramic powder, so that interstices between sintered particles will be utilized as pores. For making an epoxy mold, for example, an epoxy resin (including a hardener), water, and a filler are mixed into an emulsion slurry of the o/W type (an oil phase is dispersed in a water phase which is a continuous phase), and after the emulsion slurry is hardened, pores are formed in the water phase which is a continuous phase.

For applying the casting method according to the present invention to an industrial production line, the steps of the method have their own characteristic operations. For example, a large amount of water is possibly discharged from the mold in the step of controlling the water saturation percentage of the water absorption layer and the step of releasing the molded product from the mold with the water film, and dedicated devices are required for the introduction of the slurry and the vacuum suction. The cost of equipment may be reduced by associating the steps with respective stations, providing a facility for processing discharged water in the steps of discharging a large amount of water, and providing dedicated devices only in the stations of corresponding steps, rather than for all molds. In such an arrangement, since a carriage device is needed to move the mold between stations, whether the type in which the mold is movable or the type in which the mold is fixed should be selected differs from case to case.

Figure 3:
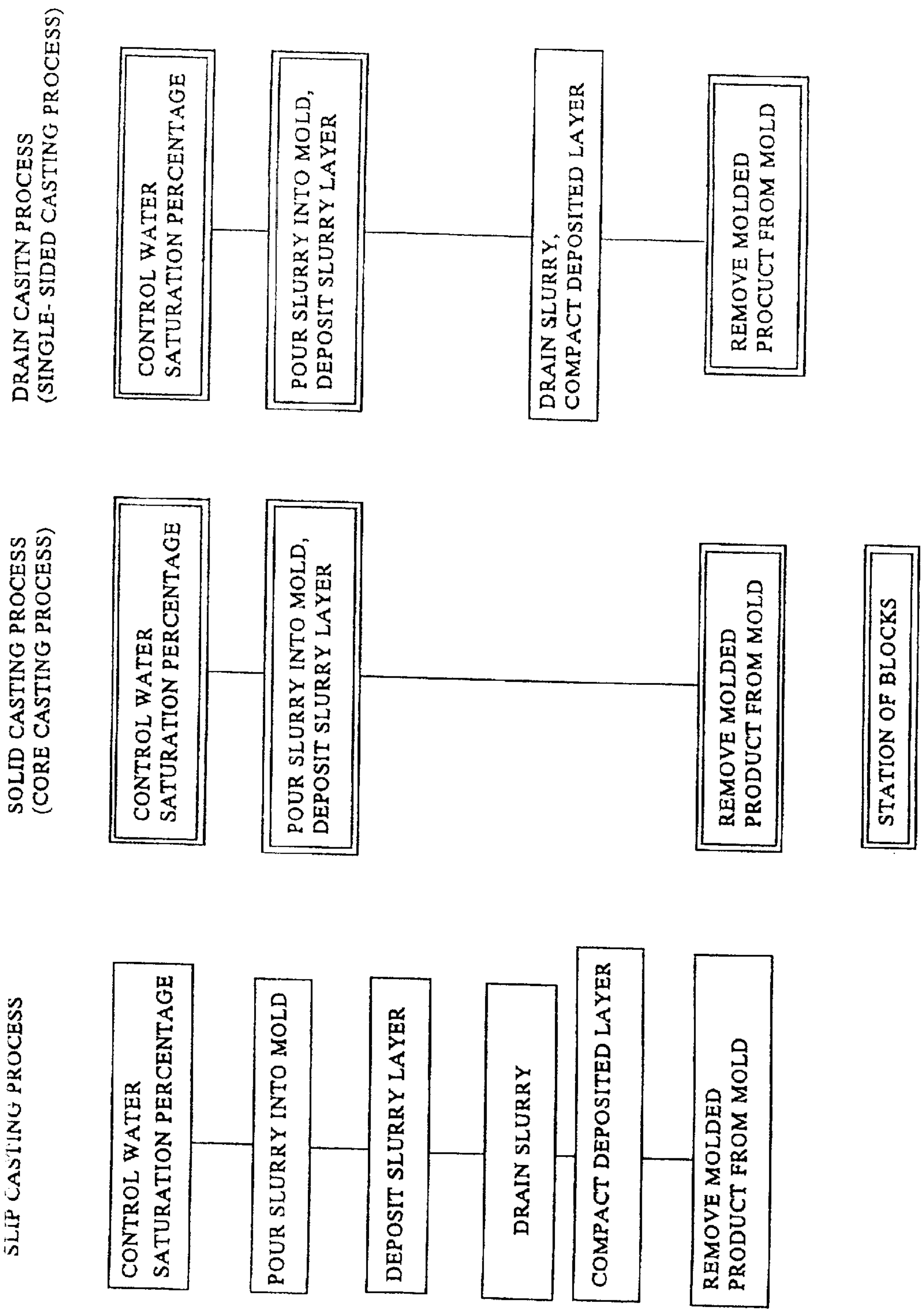
FIG. 3 is a block diagram of successive steps in a slip casting method according to the present invention.

In the type in which the mold is movable, not all steps are required to be carried out in different stations. As shown in FIG. 3, stations may be provided for respective blocks where some successive steps are put together.

If stations are provided for respective blocks, and a plurality of molds are handled in one station, then the number of stations is reduced, but the carriage device for the molds is complex.

If the disadvantage associated with a complex carriage device for the molds is too large, then it is preferable to use a system which handles a single mold in one station. Such a system should preferably employ two stations, i.e., a station in which the slurry is poured into the mold and a layer is deposited in the mold (the slurry is discharged and the deposited layer is compacted), and a station in which the molded produced is released from the mold. Controlling the water saturation percentage is carried out in either one of the two stations (usually, the station in which the molded product is released from the mold).

Applications of the slip casting method according to the present invention are not limited to any specific fields. However, the slip casting method according to the present invention is effectively applied to the production of ceramic whiteware such as sanitary earthenware, fine ceramic products, and powder metallurgy products, for example.

A slip casting mold and a method of manufacturing an open porous body for use in such a slip casting mold according to the present invention will be described below.

An epoxy compound used in the present invention has one or more epoxy rings in one molecule, is a liquid at normal temperature, and has a low viscosity convenient for producing an emulsion slurry. The epoxy compound should preferably be a glycidyl epoxy resin, and more preferably a bisphenol epoxy resin such as a bisphenol A epoxy resin, a bisphenol F epoxy resin, a bisphenol AD epoxy resin, or the like.

A hardener for the epoxy compound should preferably be of polyamide, polyamine, modified polyamine, or a mixture thereof for producing an emulsion slurry of low viscosity. (The emulsion slurry of low viscosity is preferable because it can be introduced into every corner and crevice of the large and complex slip casting space of molds for forming large and complex molded products.) Particularly preferable among those hardeners is a polyamide hardener.

The development of self water absorption capability and mold releasability with a filler, which is the most important aspect of the present invention, will be described below. The self water absorption capability and mold releasability can be developed with a filler by various means which can be combined with each other. With respect to the self water absorption capability, the ability of a mold to deposit the slurry is produced by capillary attractive forces of the mold material. Therefore, the question is how capillary attractive forces of the mold material are developed by the filler. In this connection, it is important to note that the deposition characteristics of the slurry material are affected by not only the capillary attractive forces of the mold material but also the resistance to passage of water. The resistance to passage of water is roughly divided into a resistance imposed by the deposited layer and a resistance imposed by the mold (strictly, from the molding surface of the mold to the tip end of the water saturated portion thereof). A mold which provides large capillary attractive forces has a small pore diameter. However, since a mold which has a small pore diameter presents a large resistance to passage of water, a mold which provides large capillary attractive forces may not necessarily have an excellent self water absorption capability. It is necessary for a mold to have a balance between capillary attractive forces and a resistance imposed by the mold material to passage of water. Inasmuch as the resistance imposed by the mold material to passage of water affects the deposition rate in combination with the resistance imposed by the deposited layer to passage of water, optimum properties of the mold cannot be determined solely based on the mold material, but should be determined in combination with various deposited layers.

For slip casting a molded product with a completely dry mold, if the average water content percentage of the deposited layer is constant and also the mold absorbs water uniformly, then the ratio between the resistance imposed by the deposited layer to passage of water and the resistance imposed by the mold material to passage of water is constant at all times. In the slip casting method according to the present invention, it is sometimes preferable to slip cast a molded product with a mold having a considerably high water saturation percentage. In such a case, the ratio between the resistance imposed by the deposited layer to passage of water and the resistance imposed by the mold material to passage of water varies as the slurry is deposited, and hence it is necessary to take into account the water saturation percentage of the mold upon start of the deposition of the slurry and the deposition time (the amount of the deposited material).

In view of the above analysis, the inventors have conducted experiments on various materials for slip casting sanitary earthenware under various different casting conditions, and found that the following conditions should be satisfied in order to manufacture a slip casting mold which provides an industrially effective deposition rate:

If the hardener mainly made of polyamide is used, then the filler should preferably have an average particle diameter ranging from 0.3 $\mu$m to 8 $\mu$m. The filler may be of any material insofar as it can be bonded by an epoxy resin and its grain size can be controlled. For example, the filler may be of a powder of siliceous stone or a powder of siliceous sand. The average particle diameter is defined as a particle diameter representing a 50% cumulative volume according to a volumetric reference. If the average particular diameter were smaller than 0.3 $\mu$m or greater than 8 $\mu$m, then insufficient capillary attractive forces would be developed under industrial casting conditions.

If the hardener is made of a product produced by are action between chain-like fatty primary polyamine and glycidyl ether having two or more glycidyl groups in one molecule, then the filler should preferably have an average particle diameter ranging from 1 $\mu$m to 20 $\mu$m. If the average particular diameter were smaller than 1 $\mu$m or greater than 20 $\mu$m, then insufficient capillary attractive forces would be developed under industrial casting conditions. The filler may be of any material insofar as it can be bonded by an epoxy resin and its grain size can be controlled. For example, the filler may be of a powder of siliceous stone or a powder of siliceous sand. The chain-like fatty primary polyamine is preferably represented by $H_2N[(CH_2)_2NH]_n(CH_2)_2NH_2$ with amino groups on opposite ends of the molecule, and more preferably comprises diethylenetriamine, triethylenetetramine, tetraethylenepentamine, or pentaethylenehexamine. The glycidyl ether having two or more glycidyl groups in one molecule preferably comprises neopentyl glycol glycidyl ether having two glycidyl groups in one molecule, 1,6 hexanediol glycidyl ether, ethylene glycol glycidyl ether, bisphenol A glycidyl ether, or trimethylolpropane triglycidyl ether having three glycidyl groups in one molecule. In the reaction between chain-like fatty primary polyamine and glycidyl ether having two or more glycidyl groups in one molecule, if m amino groups per molecule of the chain-like fatty primary polyamine are to be changed into imino groups, then the preferable rate of progress of the reaction which is represented by the number m of amino groups is in the range of $0.1 \leqq m \leqq 1.5$ (if imino groups are to be further reacted with the glycidyl groups, then the number of such imino groups is also counted as m). If the number m were smaller than 0.1, then insufficient capillary attractive forces would be developed under industrial casting conditions. If the number m were greater than 1.5, then the product produced by the reaction between chain-like fatty primary polyamine and glycidyl ether having two or more glycidyl groups in one molecule would be too viscous to handle with ease.

If the hardener is primarily composed of 1–5 wt % of a product produced by a reaction between monomer fatty acid and chain-like fatty primary polyamine and 99–95 wt % of a product produced by a reaction between polymer fatty acid and chain-like fatty primary polyamine, then the filler should preferably have an average particle diameter ranging from 1 $\mu$m to 20 $\mu$m. If the average particular diameter were smaller than 1 $\mu$m or greater than 20 $\mu$m, then insufficient capillary attractive forces would be developed under industrial casting conditions. The filler may be of any material insofar as it can be bonded by an epoxy resin and its grain size can be controlled. For example, the filler may be of a powder of siliceous stone or a powder of siliceous sand. The monomer fatty acid is preferably mainly composed of oleic acid, linolic acid, or erucic acid. The chain-like fatty primary polyamine is preferably represented by $H_2N[(CH_2)_2NH]_n(CH_2)_2NH_2$ with amino groups on opposite ends of the molecule, and more preferably comprises diethylenetriamine, triethylenetetramine, tetraethylenepentamine, or pentaethylenehexamine. The polymer fatty acid is preferably mainly composed of dimer acid. If the proportion of the product produced by the reaction between monomer fatty acid and chain-like fatty primary polyamine were smaller than 1 wt % or greater than 5 wt %, then insufficient capillary attractive forces would be developed under industrial casting conditions. If the proportion of the product produced by the reaction between polymer fatty acid and chain-like fatty primary polyamine were greater than 99 wt % or smaller than 95 wt %, then insufficient capillary attractive forces would be developed under industrial casting conditions.

The various preferable means for causing an open porous body to develop a self water absorption capability with a filler have been described above according to the type of the filler. Now, the development of mold releasability with a filler will be described below. The development of mold releasability with a filler can be classified into two large categories. In the first category, a mold material itself is given mold releasability by the action of a filler. According to one preferable example of this category, the filler is primarily composed of aluminum hydroxide. The filler may be entirely composed of aluminum hydroxide, or may be combined with another filler. If the filler is combined with another filler, then the proportion of aluminum hydroxide in the combination of fillers should preferably be 30 vol. % or more.

According to another preferable example of this category, the filler is primarily composed of a hydraulic material. In this example, a mold material is made of an emulsion slurry of the O/W type. Since the hydraulic material of the filler is hardened by water of the continuous phase, an open porous body can easily be produced. The filler may be composed of a hydraulic material in its entirety, or may be combined with another filler. If the filler is combined with another filler, then the proportion of the hydraulic material in the combination of fillers should preferably be 30 vol. % or more. The hydraulic material is preferably alumina cement, Portland cement, mixed cement composed primarily of Portland cement, $\alpha$ hemihydrate gypsum, or $\beta$ hemihydrate gypsum.

Another advantage which is obtained by using a hydraulic material as a main component of the filler is that the grain size distribution of the filler can be controlled by the crystal of fine particles generated by a hydrating reaction. Therefore, using a hydraulic material as a main component of the filler can be effective to develop capillary attractive forces of an open porous body. If a hydraulic material is used as a material of the filler, then various additives including a hardening accelerator, a hardening retarder, an expanding agent, an AE agent, etc. which can be used in combination with various hydraulic materials may be added.

If a hydraulic material is used as a material of the filler, then two factors, i.e., a curing reaction of a resin and a hydrating reaction of the hydraulic material, are involved in a hardening reaction of an emulsion slurry, and a balance is required to be achieved between the above two factors. With respect the curing reaction of a resin, the preferable hardening temperature (the atmospheric temperature of a curing chamber) ranges from 20 to 50° C., which is a normal temperature range for curing an epoxy resin. If a hydraulic material is used as a material of the filler, then since the deposition rate may be greater at lower curing temperatures, the preferable hardening temperature ranges from −20 to 50° C. If the curing temperature is set to 20° C. or below, it is preferable to cure the resin at 20° C. or below in a primary curing process and then cure the resin at 20 to 50° C. in a secondary curing process for post-curing of the resin. For setting the curing temperature to a lower temperature, it is necessary to not only control the temperature of the curing chamber, but also cool the materials used. Cooling the hydraulic material before it is mixed with other materials is often effective to increase the deposition rate in particular.

In the second category of the development of mold releasability with a filler, the ability of an open porous body to pass a fluid therethrough is employed. The ability of an open porous body to pass a fluid therethrough is the ability of a mold of an open porous body to pass water and air therethrough for releasing a molded product from the mold with the water and air supplied to a boundary surface between the mold and the molded product under a back pressure applied to the mold. One problem which is encountered is that if capillary attractive forces of the mold are used to deposit a layer in the mold, then reducing the diameter of pores of the mold for increasing the capillary attractive forces also reduces the ability of the open porous body to pass a fluid therethrough. To solve this problem, the grain size distribution of the filler may be selected to be as sharp as possible, i.e., the filler maybe of uniform particle diameters. In as much as it is highly industrially difficult to make uniform the diameters of all particles, there is a preferable grain size distribution that can be controlled industrially, as follows:

Generally, the grain size distribution of a powder is expressed by a Rosin-Rammler's distribution. According to the Rosin-Rammler's distribution, a particle diameter corresponding to 36.8% by integrated sieved volume (which does not mean actual sieving, but means that volume % of particles having diameters greater than the particle diameter is 36.8%) is referred to as an absolute size constant, and recognized as a central particle diameter. In order to increase the ability to pass a fluid without substantially affecting the deposition rate, it is preferable to make sharp the grain size distribution of fine particles in particular, and the integrated sieve volume of particle diameters which are ¼ of the absolute size constant may be selected not to exceed 30%. With respect to the grain size distribution of coarse particles, the ability to pass a fluid can be increased by adding a small amount of coarse particles (the grain size distribution has two or more peaks, i.e., a peak provided by the central fine particles and a peak provided by the small amount of coarse particles) Adding the small amount of coarse particles is also effective to slightly suppress the occurrence of a dilatancy phenomenon (described later on). The filler may be of any material insofar as it can be bonded by an epoxy resin and its grain size can be controlled. For example, the filler may be of a powder of siliceous stone or a powder of siliceous sand.

A first method of preventing the emulsion slurry from exhibiting dilatancy is to add a dilatancy reducing agent as a material of the emulsion slurry. Preferable dilatancy reducing agents include various nonionic surface active agents, cationic surface active agents, anionic surface active agents, ampholytic surface active agents, organic solvents such as methanol, ethanol, isobutyl alcohol, acetone, etc., polymeric electrolytes such as carboxylmethyl cellulose sodium salt, methyl cellulose sodium salt, etc., and polymeric materials such as polyethylene oxide which can be dispersed in water to impart thixotropy.

A second method of preventing the emulsion slurry from exhibiting dilatancy is to mix and stir an epoxy compound and water, then add a filler to the mixture and mix and stir the mixed materials, and thereafter add a hardener to the mixture and mix and stir the mixed materials.

The epoxy compound, the hardener, and the filler for developing self water absorption capability and mold releasability, which are used as main materials of the emulsion slurry according to the present invention have been described above. To these materials, there may also be added a reactive diluting agent such as butyl glycidyl ether, aryl glycidyl ether, styrene oxide, phenyl glycidyl ether, cresyl glycidyl ether, ethylene glycol glycidyl ether, neopentyl glycol glycidyl ether, 1,6 hexanediol glycidyl ether, trimethylolpropane triglycidyl ether, or the like, a hardening accelerator such as benzyldimethylamine, 2,4,6-tris (dimethylaminomethyl)phenol, 2,4,6-tris (dimethylaminomethyl)phenol tri-2-ethylhexylate, or the like, a soluble salt such as potassium chloride, sodium chloride, zinc chloride, calcium chloride, barium chloride, titanium chloride, iron chloride, nickel chloride, magnesium chloride, aluminum sulfate, zinc sulfate, cobalt sulfate, aluminumammoniumsulfate, aluminumpotassiumsulfate, potassium sulfate, cobalt sulfate, iron sulfate, copper sulfate, sodium sulfate, nickel sulfate, magnesium sulfate, manganese sulfate, sodium hydroxide, potassium hydroxide, calcium hydroxide, or the like, a debubblizer, a coloring agent, a surface active agent, and the like.

The open porous body for use in a slip casting mold for slip casting a powdery material has been described above. A slip casting mold which incorporates the open porous body will be described below. The open porous body serves as a molding surface of the slip casting mold. Since the slip casting process which employs the slip casting mold according to the present invention is carried out under low pressures, the slip casting mold does not require substantial strength. Therefore, major components of the slip casting mold may be composed of the open porous body (whose strength is lower than the strength of a body which is not porous), and the slip casting mold is of a simple structure and can be manufactured inexpensively.

However, a backing layer maybe mounted on the reverse side of the mold which is opposite to the molding surface thereof. The backing layer offers the following advantages: (1) The mold is made strong to provide against damage though the slip casting process is carried out under low pressures. (2) The open porous body layer can be made as thin as possible and hence is allowed to have uniform properties. If air grooves are defined in the mold, then since the distance from the air grooves to the reverse side of the mold is reduced, the amount of water and air supplied to mold portions which have nothing to do with releasing the molded product from the mold is reduced, thereby improving mold releasability. The backing layer may be made of any materials, but can easily be manufactured if it is made by solidifying a flowable material. For example, the backing layer may be made of plastic (whose constituents may all be organic, or which may contain a considerable proportion of an inorganic filler), or a hydraulic material such as concrete, mortar, or the like. A reinforcing layer such as an iron frame may be mounted on the mold outwardly of the backing layer.

The backing layer and the open porous body layer may be separately produced and bonded to each other. Alternatively, one of the backing layer and the open porous body layer may be produced first, and after an adhesive is coated on a mating surface thereof, the other layer may be poured onto the layer which has been produced first. If the other layer which is poured subsequently has a bonding capability with respect to the layer which has been produced first, then the adhesive is not required to be coated on the mating surface.

The mold material which employs the open porous body according to the present invention is characterized by good mold releasability. The development of mold releasability can be classified into two large categories. In the first category, the mold material itself is given mold releasability. In the second category, mold releasability is based on the excellent ability of the open porous body to pass a fluid therethrough under a back pressure applied to the mold. If a mold material in the second category is used, then the open porous body is required to have air and water passing means. If a mold material in the first category is used, then it does not necessarily need any air and water passing means. However, if mold releasability is to be further increased or the open porous body is to be evacuated to increase the deposition rate during the deposition process, then a mold material in the first category may be combined with air and water passing means.

Air and water passing means for passing air and water into the open porous body may comprise air grooves defined inside or in the reverse side of the open porous body for introducing air and water through the air grooves or evacuating the open porous body through the air grooves. The air grooves may be arranged at constant intervals substantially parallel to the molding surface as shown in FIG. 1, or at constant intervals substantially perpendicular to the molding surface, or may otherwise be arranged in various patterns in the open porous body, so that when air under pressure is supplied to the open porous body, water and air are discharged substantially uniformly from the molding surface through the air grooves. The air grooves are connected into one or more main air grooves which are connected to a pipe extending out of the mold for pressurizing or evacuating the open porous body.

Another air and water passing means for passing air and water into the open porous body may comprise a coarse porous layer disposed on the reverse side of the open porous body layer and having an air pipe extending out of the mold for passing water and air, as shown in FIG. 2. In this arrangement, when the air pipe is pressurized, the pressure in the coarse porous layer tends to be relatively uniform because the pores thereof have large diameters, for thereby discharging water and air relatively uniformly from the molding surface for removing the molded product from the mold. The coarse porous layer preferably has an average pore diameter of 100 $\mu$m for making uniform the pressure in the coarse porous layer. One air pipe may be provided per mold, or if the pressure in the coarse porous layer is not uniform with one air pipe, then a plurality of air pipes may be provided per mold. These air pipes extend out of the mold for pressurizing or evacuating the open porous body.

The coarse porous layer may be made of any materials insofar as they are strong enough not to be damaged when pressurized. For example, the coarse porous layer may be made of a material produced by mixing a liquid resin and a powder having an average particle diameter ranging from 0.1 to 5.0 mm at a ratio of 15–50 : 100 and then curing the mixture.

The open porous body layer and the coarse porous layer may be separately produced and bonded to each other.

Alternatively, one of the open porous body layer and the coarse porous layer may be produced first, and after an adhesive is coated on a mating surface thereof, the other layer may be poured onto the layer which has been produced first. If the other layer which is poured subsequently has a bonding capability with respect to the layer which has been produced first, then the adhesive is not required to be coated on the mating surface. When the open porous body layer and the coarse porous layer are joined to each other, they should allow air and water to pass between them, unlike the joint between the backing layer and the open porous body layer. If an adhesive layer which is not permeable to air and water is provided between the open porous body layer and the coarse porous layer, then the adhesive layer should partly cover the mating surface as in a grid-like pattern to leave surface portions for passing air and water therethrough.

The air grooves and the coarse porous layer have been described above as the air and water passing means for passing air and water to the open porous body layer. The air grooves or the coarse porous layer is required to be provided with the mold. To eliminate such a mold structure, a cassette case may be detachably mounted on the reverse side of the open porous body layer.

Figure 4:
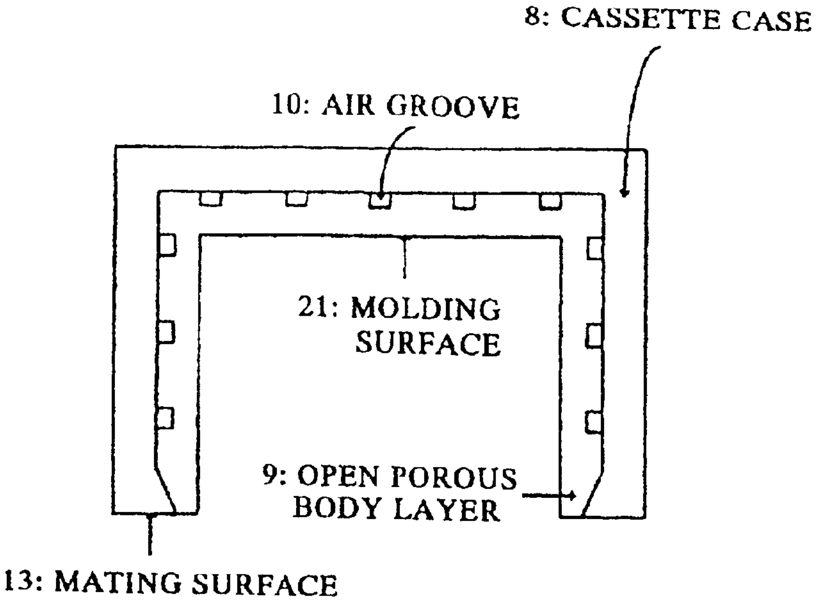
FIG. 4 is a schematic view of a cassette-type slip casting mold according to the present invention, with air grooves defined in an open porous body layer.
Figure 5:
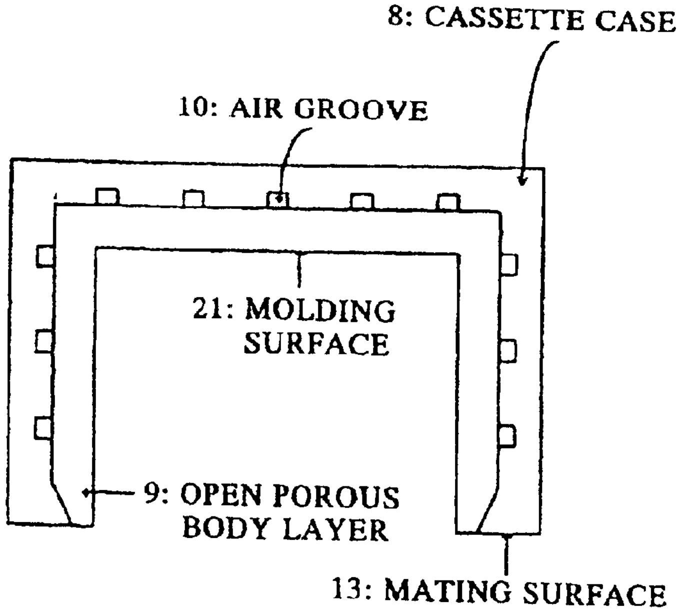
FIG. 5 is a schematic view of a cassette-type slip casting mold according to the present invention, with air grooves defined in a cassette case.

The cassette case is used semipermanently, and when the open porous body layer can no longer be used due to clogging, it is discarded, and a new open porous body layer is set in the cassette case. Air and water passing means for passing air and water to the open porous body layer of a slip casting mold of this structure may comprise air grooves disposed in a boundary surface between the open porous body layer and the cassette case. The air grooves may be defined in either the open porous body layer as shown in FIG. 4, or in the cassette case as shown in FIG. 5. The term "air grooves" used herein represents a space for passing water and air therethrough. Therefore, the air grooves need not be defined as shown in FIGS. 4 and 5, but may comprise a gap between the cassette case and the open porous body layer. In FIGS. 4 and 5, the open porous body layer is thinner at a mating surface of the mold for the following reasons: When molds are combined and pressed to form a molding space therein, the mating surfaces are subjected to forces. The open porous body layer which is low in strength is thinner at the mating surface to avoid damage from those forces.

In the slip casting mold of this structure, the cassette case and the open porous body layer are required to be accurately, detachably combined with each other for preventing water and air from leaking from the interface between the cassette case and the open porous body layer when the air grooves are pressurized. The cassette case and the open porous body layer may be detachably joined with each other by a mechanical means such as bolts or a chemical means such as an adhesive which allows the open porous body layer to be peeled off for replacement. The cassette case may be made of any materials such as resin, metal, or the like. A reinforcing layer such as an iron frame may be mounted on the mold outwardly of the cassette case.

Applications of the slip casting mold according to the present invention are not limited to any specific fields. However, the slip casting mold according to the present invention is effectively applied to the production of ceramic whiteware such as sanitary earthenware, fine ceramic products, and powder metallurgy products, for example.

Each of specimens mixed at proportions shown in Tables 2 and 3, given below, was placed in a stainless container, and intensively stirred for 10 minutes at normal temperature, producing a uniform O/W-type emulsion slurry. The emulsion slurry was poured into a mold which is impermeable to water, covered so that no water would be evaporated, and left to stand in a room at 45° C. for 24 hours until it is hardened while containing water. Some mixing and hardening conditions were different from those described above as described in Remark 1 in Tables 2 and 3.

The hardened body was removed from the mold, and left to stand in a drier at 50° C. for 24 hours for evaporating water, producing an open porous body. The water is evaporated for the purpose of measuring the properties of the open porous body. The evaporation of the water may not necessarily be required for the actual production of a slip casting mold. The properties of the open porous body are shown in the test results in Tables 2 and 3. The gypsum molds usually found in industrial use have a deposition rate of about 1.5. Though experimenting methods and results are omitted from illustration, all open porous bodies in Specimens 1–32 and Reference in Tables 2 and 3 were evaluated for water resistance, and were confirmed as being substantially water-resistant compared with the water-soluble gypsum molds.

In each of Specimens 1–5, a powder of siliceous sand having an average particle diameter of about 2.5 $\mu$m was used as a filler, making a grain size distribution sharp. In Reference, a powder of siliceous sand having an average particle diameter of about 2.5 $\mu$m was used also as a filler, but the powder of siliceous sand was simply ground to make a grain size distribution broad.

In Specimens 1–5, the deposition rate constants range from about 1.7 to 1.9, and do not differ largely from each other. However, the amount of water passed by Specimens 1–5 was at least three times the amount of water passed by Reference, and was greater as the grain size distribution was sharper. The amount of water passed by Specimen 5, whose grain size distribution had two peaks provided by the fine and coarse particles, was greater.

In Specimens 6–15, powders of siliceous sand having various particle diameters with a sharp grain size distribution were used as a filler. The smaller the average particle diameter, the greater the deposition rate constant, and the smaller the amount of passed water. The siliceous sands used in above Specimens have their grain size controllable and examples of the filler which can be bonded by an adhesive.

To inspect effects of the shape of the filler, glass beads which is almost fully spherical in shape were used in Specimens 16–18. The spherical filler has a sharp grain size distribution, but not so large an ability to pass water, as compared with the above filler. The spherical filler, however, offers advantages in that since the viscosity of the emulsion slurry is low, the dilatancy phenomenon is less liable to occur, and mold releasability strength is low.

In Specimens 19–22, a filler of aluminum hydroxide was used. As can be seen from the test results thereof, the open porous bodies were released without application of forces. In Specimens 23–32, a filler of a hydraulic material was used. The open porous bodies in Specimens 23–32 had a self mold releasability as with those in Specimens 19–22 in which a filler of aluminum hydroxide was used.

TABLE 2

| Material | Specimen No. Ref. | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Epicoat 815 (*1) | 445 | 445 | 445 | 445 | 445 | 445 | 345 | 390 | 470 | 520 | | 448 | 200 | | | |
| Epomic R710 (*2) | | | | | | | | | | | 450 | | 225 | 450 | | |
| Epicoat 807 (*3) | | | | | | | | | | | | | | | 503 | 446 |
| m.p.PCGE (*4) | | | | | | | | | | 40 | 69 | | 50 | 23 | | |
| Polyamide hardener A (*5) | 160 | 160 | 160 | 160 | 160 | 160 | 166 | 170 | 172 | 176 | | 165 | 160 | | 185 | 160 |
| Polymide L-55-3 (*6) | 13 | 13 | 13 | 13 | 13 | 13 | 13 | | | | | | | | | |
| Hardener B (*7) | | | | | | | | | | | | 7 | 23 | | 16 | 18 |
| Hardener C (*8) | | | | | | | | | | | 205 | | | 189 | | |
| 2.4.6-tris(diaminomethyl)phenol (*9) | 14 | 14 | 14 | 14 | 14 | 14 | 13 | 14 | 14 | 14 | 13 | 11 | 12 | | | |
| Powder of siliceous sand (*10) | | | | | | | | | | | | | | | | |
| A | 3004 | | | | | | | | | | | | | | | |
| B | | 3004 | | | | | | | | | | | | | | |
| C | | | 3004 | | | | | | | | | | | | | |
| D | | | | 3004 | | | | | | | | | | | | |
| E | | | | | 3004 | | | | | | | | | | | |
| F | | | | | | 3004 | | | | | | | | | | |
| G | | | | | | | | | | 1980 | | | | | | |
| H | | | | | | | | | 2541 | | | | | 2449 | 2417 | 2471 |
| I | | | | | | | | 3633 | | | | | | | | |
| J | | | | | | | 4158 | | | | 2226 | | | | | |
| K | | | | | | | | | | | | 3003 | 2826 | | | |
| Glass beads A (*11) | | | | | | | | | | | | | | | | |
| Glass beads B (*12) | | | | | | | | | | | | | | | | |
| Aluminum hydroxide (*13) | | | | | | | | | | | | | | | | |
| Hemihydrate gypsum (*14) | | | | | | | | | | | | | | | | |
| Alumina cement (*15) | | | | | | | | | | | | | | | | |
| Portlant cement (*16) | | | | | | | | | | | | | | | | |
| Aluminum sulfite (*17) | | | | | | | | | | | | | | | | |
| Polyethylene oxide (*18) | | | | | | | 0.6 | 0.6 | 0.8 | 0.9 | 0.8 | 0.8 | 0.8 | | | |
| Water | 1230 | 1230 | 1230 | 1230 | 1230 | 1230 | 900 | 1050 | 1350 | 1500 | 1230 | 1230 | 1260 | 1410 | 1380 | 1440 |
| Remark 1 | | | *19 | *19 | *19 | *19 | | | | | | | | *19 | *19 | *19 |
| Test results | | | | | | | | | | | | | | | | |
| Bending strength (MPa) (*23) | 6.0 | 6.5 | 6.3 | 6.7 | 6.7 | 7.1 | 10.3 | 8.2 | 5.1 | 3.9 | 6.7 | 7.0 | 7.3 | 6.9 | 7.0 | 7.1 |
| Flexural modulus (MPa) (*23) | 980 | 930 | 950 | 920 | 990 | 930 | 1350 | 1180 | 840 | 680 | 980 | 1050 | 1120 | 980 | 990 | 950 |
| Deposition rate constant (0.01 $mm^2$/sec) ( | 1.7 | 1.7 | 1.8 | 1.9 | 1.7 | 1.9 | 1.5 | 1.7 | 3.4 | 4.1 | 1.8 | 1.7 | 1.9 | 1.8 | 1.7 | 1.6 |
| Amount of passed water (1000 $mm^3$/3 min.) ( | 43 | 110 | 140 | 180 | 230 | 330 | 690 | 500 | 150 | 86 | 190 | 200 | 180 | 160 | 170 | 210 |
| Mold releasability strength (0.01 MPa) ( | 1.0 | 0.6 | 0.5 | 0.5 | 0.4 | 0.5 | 0.6 | 0.5 | 0.4 | 0.3 | 0.5 | 0.5 | 0.5 | 0.5 | 0.4 | 0.5 |
| Emulsion slurry viscosity (mPa · sec) (* | 5700 | 2300 | 2500 | 2000 | 2200 | 1800 | 5900 | 4200 | 1600 | 1100 | 2200 | 2000 | 1600 | 2200 | 1800 | 1700 |
| Remark 2 | | | | | *28 | | | | | | | | | | | |

The unit for specimens is 0.001 kg.

TABLE 3

| Material | Specimen No. 16 | 17 | 18 | 19 | 20 | 21 | 22 | 23 | 24 | 25 | 26 | 27 | 28 | 29 | 30 | 31 | 32 |
|---|---|---|---|---|---|---|---|---|---|---|---|---|---|---|---|---|---|
| Epicoat 815 (*1) | 445 | | 445 | 445 | 499 | 445 | 415 | 1114 | 1032 | 722 | 600 | 589 | 493 | 589 | 429 | 493 | 343 |
| Epomic R710 (*2) | | 400 | | | | | | | | | | | | | | | |
| Epicoat 807 (*3) | | | | | | | | | | | | | | | | | |
| m.p.PCGE (*4) | | 45 | | | | | | | | | | | | | | | |
| Polyamide hardener A (*5) | 160 | 173 | 160 | 173 | 176 | 173 | 161 | 413 | 413 | 271 | 222 | 218 | 182 | 222 | 159 | 182 | 127 |
| Polymide L-55-3 (*6) | 13 | | 13 | | 20 | | | | | | | | | | | | |
| Hardener B (*7) | | | | | | | | | | | | | | | | | |
| Hardener C (*8) | | | | | | | | | | | | | | | | | |
| 2.4.6-tris(diaminomethyl)phenol (*9) | 14 | 14 | 12 | 14 | 12 | 14 | 13 | 33 | | 17 | 18 | 18 | 15 | 14 | 13 | 15 | 10 |
| Powder of siliceous sand (*10) | | | | | | | | | | | | | | | | | |
| A | | | | | | 1335 | | | | 1335 | | | | 1089 | | 546 | 634 |
| B | | | | | | | | | | | | | | | | | |
| C | | | | | | | | | | | | | | | | | |
| D | | | | | | | | | | | | | | | | | |
| E | | | | | | | | | | | | | | | | | |
| F | | | | | | | 1558 | | | | | | | | | | |
| G | | | | | | | | | | | | | | | | | |
| H | | | | | | | | | | | | | | | | | |
| I | | | | | | | | | | | | | | | | | |
| J | | | | | | | | | | | | | | | | | |
| K | | | | | | | | | | | | | | | | | |
| Glass beads A (*11) | 2730 | | 2200 | | | | | | | | | | | | | | |
| Glass beads B (*12) | | 2730 | 530 | | | | | | | | | | | | | | |
| Aluminum hydroxide (*13) | | | | 2730 | 2550 | 1517 | 1416 | | | | | | | | | | |
| Hemihydrate gypsum (*14) | | | | | | | | 1030 | 1335 | 668 | | | | | | | |
| Alumina cement (*15) | | | | | | | | | | | 1796 | 2351 | 1997 | 1175 | | | |
| Portlant cement (*16) | | | | | | | | | | | | | | | 1800 | 1449 | 1440 |
| Aluminum sulfite (*17) | | | 1.5 | | | | | | | | | | | | | | |
| Polyethylene oxide (*18) | | | | | | | | | | | | | | | | | |
| Water | 1230 | 1230 | 1230 | 1230 | 1230 | 1230 | 1230 | 1050 | 1050 | 1230 | 1530 | 1350 | 1620 | 1350 | 1800 | 1620 | 1800 |
| Remark 1 | | | | | | | | *20 | *21 | *21 | *22 | *22 | *22 | *22 | | | |
| Test results | | | | | | | | | | | | | | | | | |
| Bending strength (MPa) (*23) | 6.2 | 6.4 | 6.3 | 6.1 | 6.1 | 6.2 | 6.3 | 5.8 | 5.9 | 6.1 | 5.4 | 6.2 | 5.0 | 6.6 | 6.4 | 7.1 | 6.4 |
| Flexural modulus (MPa) (*23) | 1050 | 1030 | 1000 | 960 | 930 | 950 | 970 | 870 | 870 | 900 | 920 | 990 | 870 | 990 | 1050 | 1100 | 990 |
| Deposition rate constant (0.01 $mm^2$/sec) (*24) | 1.6 | 1.7 | 1.7 | 1.7 | 1.7 | 1.6 | 2.0 | 1.7 | 2.0 | 1.5 | 1.9 | 1.7 | 1.7 | 1.7 | 1.8 | 1.7 | 1.7 |
| Amount of passed water (1000 $mm^3$/3 min.) (*25) | 100 | 120 | 130 | 45 | 50 | 65 | 110 | 74 | 62 | 100 | 50 | 40 | 55 | 38 | | | |
| Mold releasability strength (0.01 MPa) (*26) | 0.3 | 0.3 | 0.3 | 0 | 0 | 0 | 0 | 0 | 0 | 0 | 0 | 0 | 0 | 0 | 0 | 0 | 0 |
| Emulsion slurry viscosity (mPa · sec) (*27) | 1000 | 950 | 900 | 4200 | 3800 | 4000 | 4100 | 5400 | 5000 | 5600 | 3800 | 4200 | 4000 | 4100 | 1700 | 1400 | 1600 |
| Remark 2 | | | | | | | | | | | *29 | | | | | | |

The unit for specimens is 0.001 kg.

TABLE 4

| Filler | Grain size distribution ~0.2 μm | ~0.5 μm | ~1.0 μm | ~2.0 μm | ~5.0 μm | ~10 μm | ~15 μm | ~20 μm | Absolute size constant (μm) | Absolute size constant sieve volume (%) |
|---|---|---|---|---|---|---|---|---|---|---|
| Powder of siliceous sand A | 17.8 | 29.9 | 37.4 | 45 | 57.5 | 67 | 72.8 | 77.5 | 7.1 | 43 |
| Powder of siliceous sand B | 9.8 | 17.8 | 27.5 | 42.8 | 67 | 84.5 | 92 | 96.9 | 4.2 | 29 |
| Powder of siliceous sand C | 4.1 | 10.9 | 19.5 | 42 | 74.2 | 95.7 | 98.8 | 99.7 | 3.7 | 20 |
| Powder of siliceous sand D | 1.4 | 4.7 | 13.3 | 35.6 | 86.1 | 99.7 | 100 | 100 | 3.3 | 11 |
| Powder of siliceous sand E | 0 | 1.6 | 7.1 | 30.7 | 96.5 | 99.8 | 100 | 100 | 3 | 4 |
| Powder of siliceous sand F | 2.8 | 10.4 | 21.8 | 45.5 | 78.5 | 80.1 | 96.8 | 99.3 | 3.2 | 18 |
| Powder of siliceous sand G | 29.8 | 58 | 76.1 | 90.9 | 98.9 | 99.9 | 100 | 100 | 0.6 | 25 |
| Powder of siliceous sand H | 5.4 | 15.5 | 22.5 | 60 | 94 | 99.5 | 100 | 100 | 2.1 | 17 |
| Powder of siliceous sand I | 0.7 | 1.4 | 3.2 | 9.1 | 55.1 | 98.1 | 99.8 | 100 | 5.5 | 5 |
| Powder of siliceous sand J | 0.4 | 0.7 | 0.9 | 1.2 | 10 | 89.4 | 98.5 | 99.8 | 8.2 | 1 |
| Powder of siliceous sand K | 0.2 | 0.4 | 0.6 | 0.8 | 1.7 | 10.2 | 36.1 | 63.2 | 20 | 2 |
| Glass beads A | 0 | 0 | 1.4 | 20.7 | 99.9 | 100 | 100 | 100 | 2.7 | 0 |
| Glass beads B | 0 | 0 | 0 | 0 | 12.8 | 90.3 | 100 | 100 | 8 | 0 |

Indicated numerical values represent integrated sieved volume %.

Figure 6:
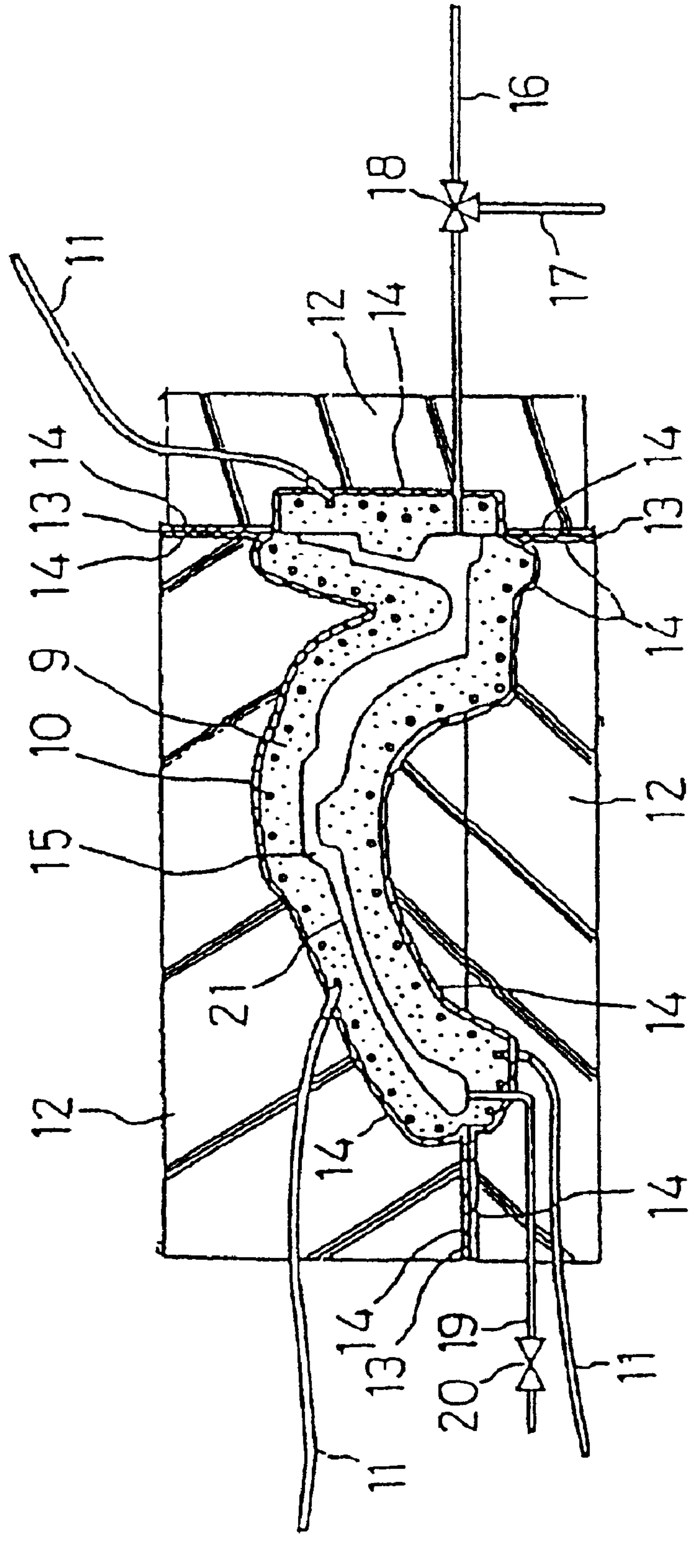
FIG. 6 is across-sectional view of an internal structure of a slip casting mold according to the present invention.

Pieces of sanitary earthenware were slip cast under casting conditions shown in Table 5, using a slip casting mold having the structure shown in FIG. 6 whose water absorption layer comprised the open porous body produced in Specimen 5. Results of evaluation of the produced pieces of sanitary earthenware are shown in Table 5. In any of Examples shown in Table 5, the slurry was not directly pressurized.

In FIGS. 1, 2, 4, 5 and 6, the reference numeral 8 represents a cassette case, 9 an open porous body layer, 10 a hollow path (air groove), 11 pipes interconnecting the air groove and sources outside of the mold, 12 backing layers, 13 mating surfaces, 14 resin layers as a sealant, 15 a slip casting space, 16 a slurry delivery pipe, 17 a slurry draining pipe, 18 a three-way cock, 19 a compressed air inlet pipe, 20 a check valve, 21 a molding surface, and 22 a coarse porous layer.

TABLE 5

| | | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Remarks |
|---|---|---|---|---|---|---|---|---|---|---|---|---|---|---|
| Mold water saturation conditions | Water saturation | Water passing time (min.) | — | — | — | 4 | 4 | 3 | 4 | — | — | — | — | |
| | | Air pressure (MPa) | — | — | — | 0.3 | 0.35 | 0.4 | 0.4 | — | — | — | — | |
| | Water drainage | Water drainage time (min.) | 4 | 3 | 1 | 1 | 1 | — | — | 1 | 0.7 | 1 | 0.7 | |
| | | Air pressure (MPa) | 0.3 | 0.35 | 0.35 | 0.25 | 0.25 | — | — | 0.2 | 0.2 | 0.15 | 0.15 | |
| | Mold water saturation percentage (%) | | 18.6 | 27.0 | 38.5 | 52.3 | 60.7 | 72.1 | 81.9 | 55.8 | 62.1 | 70.7 | 78.4 | |
| Molding conditions | Evacuating time (min.) | | 83 | 80 | 70 | 45 | 50 | 85 | 93 | 76 | 39 | 25 | 40 | |
| | Evacuating pressure (MPa) | | 0.07 | 0.07 | 0.05 | 0.05 | 0.05 | 0.07 | 0.07 | 0.07 | 0.07 | 0.07 | 0.07 #1<br>0.02 #2 | #3 |
| | Pouring time (min.) | | 5 | 5 | 5 | 5 | 5* | 5* | 5* | 5* | 5* | 4* | 3.5 | |
| | Deposition time (min.) | | 52* | 50* | 45* | 45* | 45* | 50* | 55* | 50* | 48(70) | 42(50) | 40* | |
| | Slurry head height (m) | | 0.6 | 0.6 | 0.6 | 0.6 | 0.6 | 0.6 | 0.6 | 0.45 | 0.7 | 1.2 | 2 | |
| | Slurry draining time (min.) | | 5* | 5* | 5* | 5 | 5 | 5* | 5* | 5* | 5 | 5 | 5 | #4 |
| | Slurry draining air pressure (MPa) | | 0.02 | 0.02 | 0.02 | 0.02 | 0.02 | 0.02 | 0.02 | 0.02 | 0.02 | 0.02 | 0.02 | #5 |
| | Compaction time (min.) | | 26* | 25* | 20* | 20 | 20 | 25* | 28* | 23(70) | 20 | 19 | 17 | #6 |
| | Compaction air pressure (MPa) | | 0.01 | 0.01 | 0.01 | 0.01 | 0.01 | 0.01 | 0.01 | 0.08 | 4 | 0.02 | 0.02 | |
| | Mold release air pressure (MPa) | | 0.30 | 0.30 | 0.27 | 0.25 | 0.25 | 0.23 | 0.23 | 0.25 | 0.25 | 0.25 | 25.00 | |
| Results | Molded product | Single layer thickness (mm) | 8.7 | 8.8 | 9.0 | 9.1 | 9.2 | 8.8 | 8.5 | 9.0 | 9.1 | 8.9 | 8.9 | #7 |
| | | Water content percentage (%) | 25.6 | 24.9 | 24.5 | 24.1 | 24.2 | 24.7 | 26.2 | 24.8 | 24.5 | 24.7 | 24.2 | |
| | Mold releasability | | x | ○ | ○ | ○ | ○ | ○ | ○ | ○ | ○ | ○ | ○ | #8 |

TABLE 5-continued

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Remarks |
|---|---|---|---|---|---|---|---|---|---|---|---|---|
| Molded product shape retention | x | ○ | ○ | ○ | ○ | ○ | x | ○ | ○ | ○ | ○ | #9 |
| Molded product surface peel-off | x | ○ | ○ | ◎ | ◎ | ○ | ○ | ◎ | ◎ | ◎ | ◎ | #10 |

#1: Former 30 minutes.
#2: Latter 30 minutes.
#3: Indicates a gage pressure upon evacuation.
#4: * represents combination with evacuation.
#5: ( ) represents combination with evacuation during a former half of deposition and compaction time.
#6: The numerical values in ( ) represent % of the evacuating time during the former half of deposition and compaction time.
#7: Target value: 9.0 ± 0.2
#8: ◎ Very good.
#9: ○ Good.
#10: x Poor.

A successive slip casting process was carried out under the casting conditions of Example 9 in Table 5. As a result, 5000 molded products were produced by the slip casting mold in Example 9. After the slip casing mold was used 5000 times, no reduction was seen in the deposition rate and the mold releasability.

Although there have been described what are at present considered to be the preferred embodiments of the invention, it will be understood that the invention may be embodied in other specific forms without departing from the essential characteristics thereof. The present embodiments are therefore to be considered in all respects as illustrative, and not restrictive. The scope of the invention is indicated by the appended claims rather than by the foregoing description.

What is claimed is:

1. A method of manufacturing an open porous body for use in a slip casting mold for slip casting a powder material, comprising the steps of:

stirring a mixture of an epoxy compound having at least one epoxy ring in one molecule, a hardener for reacting with the epoxy compound to harden the epoxy compound, a filler for developing self water absorption capability and mold releasability, and water into an O/W-type emulsion slurry;

casting the emulsion slurry into a mold impermeable to water; and hardening the emulsion slurry in the mold while containing the water, wherein said filler has an average particle diameter ranging 1 $\mu$m to 20 $\mu$m, and said hardener is primarily composed of 1–5 wt % of a product produced by a reaction between monomer fatty acid and chain-like fatty primary polyamine and 99–95 wt % of a product produced by a reaction between polymer fatty acid and chain-like fatty primary polyamine.

2. A method according to claim 1, wherein said emulsion slurry is prepared by mixing the epoxy compound and water into a mixture and stirring the mixture, then adding the filler to the mixture and stirring the mixture, and then adding the hardener to the mixture and stirring the mixture.

3. A method according to claim 1, wherein said hardener contains a polyamide resin.

4. A method according to claim 1, wherein said mixture further comprising a product produced by a reaction between chain-like fatty primary polyamine and glycidyl ether having two or more glycidyl groups in one molecule.

5. A method according to claim 1, wherein said filler has a grain size distribution selected such that an integrated sieve volume of particle diameters which are ¼ of the Rosin-Rammler's absolute size constant is ≦30%.

6. A method according to claim 1, wherein said mixture further comprises a dilatancy reducing agent.

7. A method according to claim 1, wherein a small quantity of coarse particles having particle diameters greater than the Rosin-Rammler's absolute size constant is added to said filler to establish a sharp grain size distribution of filler particles with at least two peaks.

8. A method according to claim 1, wherein said epoxy compound comprises a glycidyl epoxy resin.

9. A method according to claim 8, wherein said glycidyl epoxy resin comprises a bisphenol epoxy resin.

10. A method according to claim 1, wherein said filler has an average particle diameter ranging from 0.3 $\mu$m to 8 $\mu$m.

11. A method according to claim 10, wherein said filler is primarily composed of a hydraulic material.

12. A method according to claim 1, wherein said filler is primarily composed of one of aluminum hydroxide and hydraulic material.

13. A method according to claim 12, wherein said filler is primarily composed of a hydraulic material, and said hydraulic material comprises at least one material selected from the group consisting of alumina cement, Portland cement, mixed cement primarily composed of Portland cement, and hemihydrate gypsum.

* * * * *

UNITED STATES PATENT AND TRADEMARK OFFICE

CERTIFICATE OF CORRECTION

PATENT NO. : 6,866,803 B1
DATED : March 15, 2005
INVENTOR(S) : Akio Matsumoto et al.

It is certified that error appears in the above-identified patent and that said Letters Patent is hereby corrected as shown below:

Column 1,
Line 1, change "MOLD FOR USE IN SLIP CASTING METHOD, AND METHOD OF MANUFACTURING OPEN POROUS BODY FOR USE IN MOLD" to -- METHOD OF MANUFACTURING AN OPEN POROUS BODY FOR USE IN A SLIP CASTING MOLD --.

Column 6,
Lines 46 and 52, change "from 30 minute" to -- 30 minutes --.

Column 8,
Line 37, change "then, then the suction" to -- then the suction --.
Line 38, change "from 10 minute" to -- from 10 minutes --.

Column 9,
Line 2, change "molded produced" to -- molded product --.

Column 11,
Line 1, change "molded produced" to -- molded product --.

Signed and Sealed this

Third Day of January, 2006

JON W. DUDAS
*Director of the United States Patent and Trademark Office*

UNITED STATES PATENT AND TRADEMARK OFFICE

CERTIFICATE OF CORRECTION

PATENT NO. : 6,866,803 B1
APPLICATION NO. : 09/613362
DATED : March 15, 2005
INVENTOR(S) : Akio Matsumoto et al.

It is certified that error appears in the above-identified patent and that said Letters Patent is hereby corrected as shown below:

Title Page, Item [54] and Column 1, lines 1-4, change "MOLD FOR USE IN SLIP CASTING METHOD, AND METHOD OF MANUFACTURING OPEN POROUS BODY FOR USE IN MOLD" to
-- METHOD OF MANUFACTURING AN OPEN POROUS BODY FOR USE IN A SLIP CASTING MOLD --.

Column 6,
Lines 46 and 52, change "from 30 minute" to -- 30 minutes --.

Column 8,
Line 37, change "then, then the suction" to -- then the suction --.
Line 38, change "from 10 minute" to -- from 10 minutes --.

Column 9,
Line 2, change "molded produced" to -- molded product --.

Column 11,
Line 1, change "molded produced" to -- molded product --.

This certificate supersedes certificate of correction issued January 3, 2006.

Signed and Sealed this

Twenty-second Day of August, 2006

JON W. DUDAS
*Director of the United States Patent and Trademark Office*